(12) United States Patent
Schoedl et al.

(10) Patent No.: US 12,459,550 B2
(45) Date of Patent: Nov. 4, 2025

(54) RAILROAD FREIGHT CAR DRAFT GEAR FRICTION MODIFYING INSERT

(71) Applicant: Miner Enterprises Inc., Geneva, IL (US)

(72) Inventors: Erich A. Schoedl, Sugar Grove, IL (US); Donald E Wilt, Batavia, IL (US); Andy R. Kries, Elgin, IL (US)

(73) Assignee: Miner Enterprises, Inc., Geneva, IL (US)

( * ) Notice: Subject to any disclaimer, the term of this patent is extended or adjusted under 35 U.S.C. 154(b) by 946 days.

(21) Appl. No.: 17/665,058

(22) Filed: Feb. 4, 2022

(65) Prior Publication Data

US 2023/0249720 A1    Aug. 10, 2023

(51) Int. Cl.
*B61G 9/10* (2006.01)
*B61G 9/06* (2006.01)
*B61G 11/14* (2006.01)

(52) U.S. Cl.
CPC ............ *B61G 9/10* (2013.01); *B61G 9/06* (2013.01); *B61G 11/14* (2013.01)

(58) Field of Classification Search
CPC . B61G 11/14; B61G 9/06; B61G 9/10; B61G 9/14; B61G 9/20; B61G 9/00; B61G 9/04; B61G 9/24
USPC .................. 213/32 C, 32 R, 31, 37
See application file for complete search history.

(56) References Cited

U.S. PATENT DOCUMENTS

| | | | | |
|---|---|---|---|---|
| 4,576,295 A | * | 3/1986 | Carlstedt ............. | B61G 9/10 213/32 R |
| 4,591,059 A | * | 5/1986 | Hammarlund .......... | B61G 9/14 267/257 |
| 5,443,170 A | * | 8/1995 | Merker, Jr. ............ | B61G 9/10 213/38 |
| 5,452,814 A | * | 9/1995 | Merker, Jr. ............ | B61G 9/10 213/32 C |
| 5,495,957 A | * | 3/1996 | Merker, Jr. ............ | B61G 9/10 213/32 C |
| 5,501,347 A | * | 3/1996 | Merker, Jr. ............ | B61G 9/10 213/32 C |
| 5,529,194 A | * | 6/1996 | Merker, Jr. ............ | B61G 9/10 213/38 |
| D415,980 S | | 11/1999 | Wright | |
| D777,603 S | | 1/2017 | Lundy | |
| D857,554 S | | 8/2019 | Schoedl et al. | |

(Continued)

*Primary Examiner* — Zachary L Kuhfuss
(74) *Attorney, Agent, or Firm* — Law Office of John W. Harbst

(57) ABSTRACT

A railroad freight car draft gear includes a friction clutch assembly with friction members arranged in operable combination with an actuator. Each friction member has an outer friction surface which slides along a mating friction surface. A spring assembly is provided for absorbing, dissipating, and returning energy imparted to the draft gear. Recesses are provided on the respective mating friction surfaces of the draft gear. A uniquely designed preformed friction modifying insert is pressed into each recess on the clutch assembly components. Each insert includes an elongated leg having projections extending radially outward from opposed surfaces on the insert leg. Each friction modifying insert is furthermore configured to include a convex inner contact surface to facilitate insertion and active contact along with flared inner edges to improve fit between the insert and related draft gear components.

30 Claims, 9 Drawing Sheets

(56) References Cited

U.S. PATENT DOCUMENTS

| | | |
|---|---|---|
| D942,322 S | 2/2022 | Evans et al. |
| D997,075 S | 8/2023 | Donelson |
| 2002/0070189 A1 | 6/2002 | Barker et al. |
| 2017/0166225 A1 | 6/2017 | Schoedi et al. |

* cited by examiner

RAILROAD FREIGHT CAR DRAFT GEAR FRICTION MODIFYING INSERT

FIELD OF THE DISCLOSURE

This invention disclosure generally relates to railroad freight cars and, more specifically, to a railroad freight car friction modifying insert.

BACKGROUND

Many railroad freight cars have a draft gear arrangement at opposite ends thereof for absorbing, dissipating, and returning energy imparted to the railcar during operation. Such draft gears typically include a friction clutch assembly and spring assembly, Typically, and during operation, the clutch components of a draft gear will be compressed axially in both buff and draft movements of the train system whereby generating sliding forces employing friction in the clutch assembly.

The draft gear typically includes two or more internal friction surfaces. The friction clutch assembly typically includes a series of friction shoes or members arranged for longitudinal sliding and radial movements during operation of the draft gear. Each shoe or member of the friction clutch assembly has external surfaces which complement and slide along other internal mating friction surfaces. Alternatively, the mating surface can be a stationary plate/bore plate or other static friction surface.

A conventional friction clutch assembly also includes an actuator or wedge having outer friction surfaces which operably engage with and are complimentary to mating inner friction surfaces. During operation of the draft ear, the actuator longitudinally reciprocates within and relative to those inner friction surfaces in response to the actuator moving inwardly of the housing caused when axial forces are applied to the draft gear. As such, significant frictional resistance is created between the friction surfaces whereby a significant portion of the force applied to the draft gear is absorbed and dissipated. Also, the spring assembly of the draft gear serves to resist axial inward movements of the friction components so as to maintain friction between the sliding surfaces and return the clutch assembly to neutral.

Too little friction between the sliding surfaces of the clutch assembly can be detrimental in the loss of energy displacement and absorption, while too much friction between the sliding surfaces compromises the function of the clutch assembly while requiring too much force to activate and/or release the clutch assembly during operation of the draft gear. Due to the relative sliding movements and significant frictional resistance between the sliding surfaces, it has been found desirable to arrange one or more lubricant components therebetween at the time the draft gear is initially assembled. The lubricating inserts or components are typically made of a bronze alloy or some other type of solid friction modifying material. In one form, and particularly because the mating cavity into which the lubricant insert is fitted is preferably cast into the friction component, the tolerances inherent with such recesses can and do vary considerably from one component to the next.

In one draft gear assembly process, the lubricating component is typically swaged into the a mating cavity or recess. The tolerances of the cavities or recesses along with the ability to properly size the insert or component have proven challenging, however, particularly when the insert is swaged or pressed into the friction component of the draft gear coupled with providing proper lubricating qualities during operation of the draft gear. That is, unless the mating surfaces on the lubricating components and the size of each mating cavity or recess into which the insert fits exactly conform with each other, the risks of the lubricating insert providing too much or too little lubricant between the mating sliding surfaces are significantly enhanced. Moreover, unless the mating surfaces on the lubricating components and the size of each mating cavity or recess into which the insert fits exactly conform with each other, the lubricant insert can become dislodged from the mating cavity or otherwise not properly engage with the friction surfaces.

Thus, there is a continuing need and desire for a preformed friction modifying insert which can be readily and easily pressed into a mating recess or cavity having a wider range of tolerances and which is defined by friction clutch assembly components to ensure adequate activation of the lubricant material

BRIEF DESCRIPTION

In view of the above, and in accordance with one aspect of this invention disclosure, there is provided a railroad freight car draft gear with a friction clutch assembly having multiple components which, in one form, includes sliding friction members arranged in operable combination with an actuator and are adapted for longitudinal reciprocation during operation of the draft gear. Each friction member has an outer friction surface which slides along a respective mating surface, A spring assembly is provided for absorbing, dissipating, and returning energy imparted to the draft gear.

Recesses are provided on the respective mating surfaces on the draft gear. A preformed friction modifying insert is pressed into each recess. Each insert is configured to establish an enhanced joinder with the recess into which it is pressed and to facilitate the fit between the insert and the recess, Preferably, each insert includes an elongated leg having opposed ends and at least one raised projection extending radially outward from the leg and disposed between the ends thereof. As will be appreciated by those skilled in the art, each insert serves to facilitate reciprocatory movements of the friction sliding surfaces during operation of the railroad freight car draft gear.

In one form, each insert is formed from one of the following materials: brass alloy, bronze alloy, lead alloy, impregnated plastics. Preferably, each insert is of one-piece construction and, to improve its functionality, includes two elongated legs extending generally parallel to each other and which are joined by a third leg. In one example, a cross-section of the insert reveals each leg has first and second surfaces joined by a rounded inner end and a convex outer end.

In a preferred embodiment, each insert includes a plurality of longitudinally spaced projections extending radially outward from each leg of the insert. In one embodiment, any two longitudinally adjacent projections on each insert leg radially extends from opposed generally parallel surfaces on the respective insert.

According to another aspect of this invention disclosure, there is provided a railroad freight car draft gear having an elongated metal housing. A friction clutch assembly is arranged in operable combination with the housing. The friction clutch assembly includes sliding components which, in one form, includes friction members arranged in operable combination with an actuator adapted for longitudinal reciprocation during operation of the draft gear. Each friction member of the friction clutch assembly has an outer friction surface which slides along a mating friction surface, A spring assembly is provided and operates in combination with the friction clutch assembly for absorbing, dissipating, and returning energy imparted to the draft gear.

Recesses are provided between mating surfaces on the draft gear, Each recess includes a closed inner end and an open outer end. A preformed friction modifying insert is pressed into each recess for facilitating reciprocatory movements of between the mating surfaces during operation of the railroad freight car draft gear. Each preformed insert includes an elongated leg having opposed ends defining a length of the insert, Each insert also has an inner end extending substantially the length of the insert and is disposed adjacent the closed end of the respective recess after the insert is pressed thereinto. Initially, each insert further defines an outer flared end extending substantially the length of the insert and is disposed toward the open end of each recess. When the insert is initially swaged or pressed into the recess, material from which the insert is formed flows or is displaced to fill the void created at the cavity edges along the perimeter of the recess.

Preferably, each insert is formed from one of the following materials: brass alloy, bronze alloy, lead alloy, impregnated plastics. In a preferred embodiment, each insert is of one-piece construction and, to improve its functionality, includes two elongated legs extending generally parallel to each other and which are joined to each other by a third leg, in one example, a cross-section of the insert reveals the two elongated legs extending generally parallel to each other each has first and second surfaces joined by a rounded inner end and a convex outer end.

In a preferred form, and to enhance the joinder between the insert and the recess into which the insert is pressed, each insert includes a plurality of longitudinally spaced projections extending radially outward from the leg of the insert. Any two longitudinally adjacent projections on each insert preferably radially extend from opposed surfaces on the insert to facilitate retention of the insert in the respective recess, Each projection preferably extends only partially about the leg of the insert.

According to another aspect of this invention disclosure, there is provided a railroad freight car draft gear including a housing. An open end of the housing defines a friction bore having functional and curved internal surfaces. A friction clutch assembly is arranged within the open end of the housing and includes friction shoes arranged in operable combination with an actuator adapted for longitudinal movements within the friction bore of the housing during operation of the draft gear. Each shoe of the friction cutch assembly has an angled outer surface which slides along the internal surface of the friction bore of the housing. A spring assembly is provided for absorbing, dissipating, and returning energy imparted to the draft gear.

In this embodiment, recesses or cavities are cast into the internal surface of the friction bore defined by the draft gear housing, Each recess has a closed outer end and an open inner end. A preformed friction modifying insert is swaged into each recess in the friction bore defined by the housing for facilitating reciprocatory movements of the friction clutch assembly during operation of the railroad freight car draft gear. In this embodiment, each insert is configured with an elongated and curved leg having opposed ends defining a length of the insert. An outer end of the insert extends the length thereof and is disposed adjacent the closed end of the respective recess after the insert is pressed thereinto. An inner end extends the length of the insert and has a convex profile which initially projects past the curved internal surface of the friction bore after the insert is pressed thereinto. In this embodiment, the curvature of the insert leg generally corresponds to the curvature of the internal surface of the friction bore.

Each insert is preferably formed from one of the following materials: brass alloy, bronze alloy, lead alloy, and impregnated plastics. In one form, the leg of each insert has first and second generally parallel surfaces joined by a rounded outer end. To facilitate retention within each recess, each insert can include a plurality of longitudinally spaced projections extending radially outward from the leg of the insert. In such embodiment, any two longitudinally adjacent projections on each insert radially extend from opposed generally parallel surfaces on the insert. Moreover, each raised rib extends only partially about each leg of the insert. In a preferred embodiment, each insert includes a second elongated and curved leg having opposed ends and at least one projection extending from the second leg and disposed between the ends thereof, Preferably, the elongated legs on each insert are interconnected to each other.

According to still another aspect of this invention disclosure there is provided a railroad draft gear friction modifying insert for facilitating reciprocatory movements of a friction clutch assembly during operation of a railroad freight car draft gear. The insert has an elongated leg with opposed ends defining a length of the insert therebetween. An inner flared end of the insert extends substantially the length of the insert and is disposed adjacent an open end of a respective recess defined by a mating surface of the draft gear after the insert is inserted thereinto. Moreover, the inner end of the insert has a convex profile. With this design, and after the insert is initially swaged into the recess during the assembly operation, lubricant material will be active immediately for positive engagement with mating surfaces on the draft gear particularly during initial operation of the railroad freight car draft gear.

Preferably, the insert is formed from one of the following materials: brass alloy, bronze alloy, lead alloy, and impregnated plastics. In this embodiment, the leg of the insert has first and second surfaces preferably joined by a rounded outer end. Moreover, the insert includes a plurality of longitudinally spaced projections extending from the leg of the insert. In this form, any two longitudinally adjacent projections on the insert radially extend from opposed generally parallel surfaces on the insert. In one form, each raised projection extends only partially about the leg of the insert. In a preferred embodiment, the insert includes a second elongated leg having opposed ends and at least one projection extending from the second leg and disposed between the ends thereof. In this form, the two elongated legs on the insert are interconnected to each other.

DECSRIPTION OF THE DRAWINGS

DETAILED DESCRIPTION

Figure 1:
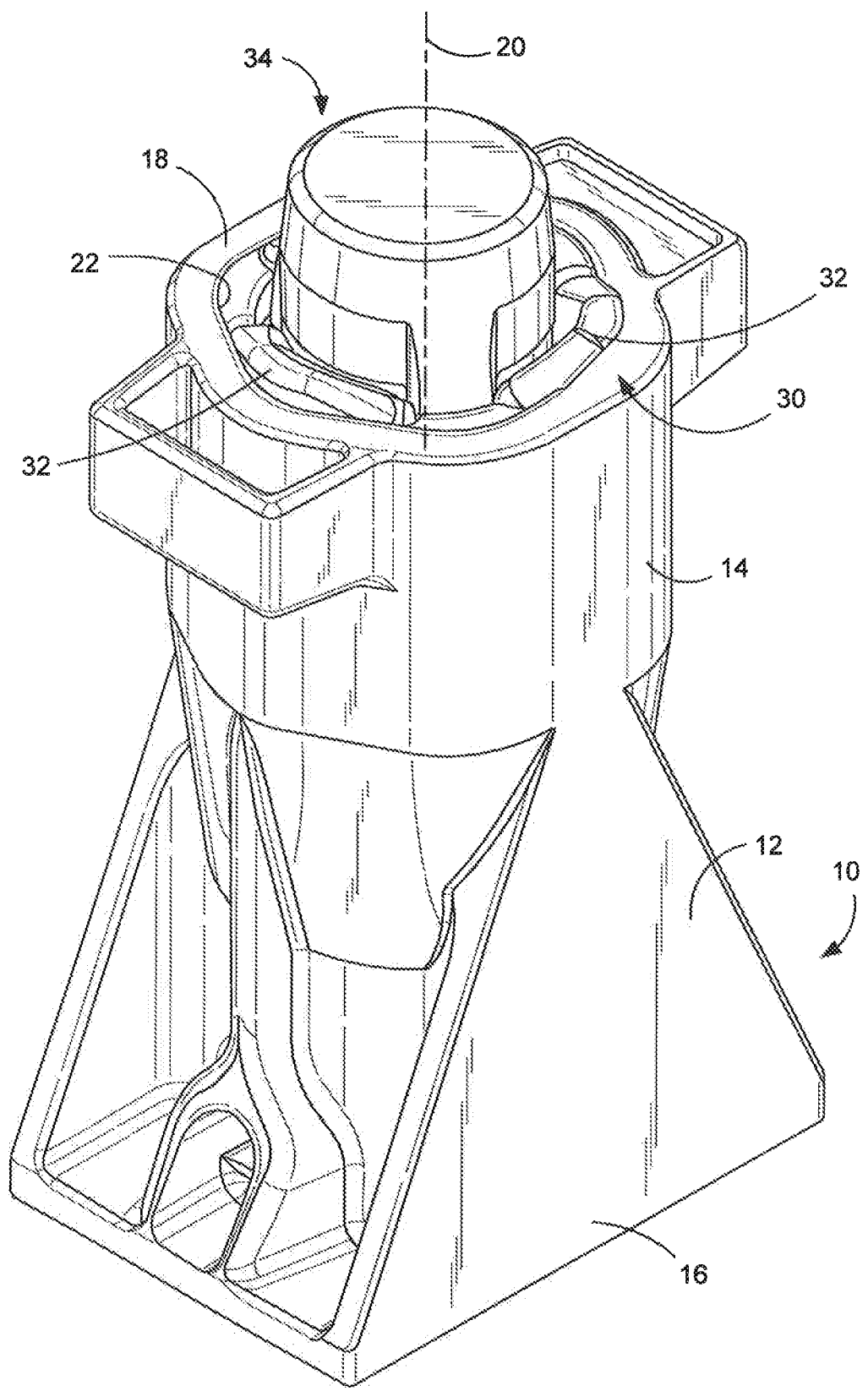
FIG. 1 is a perspective view of one form of railcar draft gear which embodies the principals and teachings of this invention disclosure.

This disclosure is susceptible of embodiment in railcar draft gears having alternative designs other than that shown in the drawings but will hereinafter be described for use with a particular draft gear assembly. The particular draft gear design illustrated and described below sets forth an exemplification of one embodiment wherein the present invention finds utility and is set forth with the understanding the draft gear design hereinafter illustrated and described is not intended to limit the invention disclosure to the specific draft gear assembly illustrated and described.

Referring now to the drawings, wherein like reference numerals indicate like parts throughout the several views, there is shown in FIG. 1 one form of a railroad freight car draft gear, generally identified by reference numeral 10. In the exemplary embodiment, draft gear 10 includes an elongated and hollow casing or housing 12 having external walls 14, In the illustrated example, the walls 14 of the housing 12 extend between a closed rear end 16 and a necked-down open end 18 which are aligned relative to each other along a longitudinal centerline or axis 20 of housing 12, As is typical, the draft gear housing 12 is formed from metal in a conventional casting operation and is usually comprised of steel.

In the exemplary embodiment, the open end 18 of housing 12 defines a friction bore 22 of a well-known type and which, in the illustrated embodiment, is cast into a six sided structure but it should be understood alternative embodiments could equally be used without detracting or departing from the true spirit and scope of this invention disclosure. As the example illustrated in FIG. 2, and given the illustrated structure at the open end of the housing 12, as is well known in the art, the friction bore 22 defines three curved and functional internal surfaces 24, 24' and 24" equally disposed 120° relative to each other. In a preferred embodiment, each internal surface 24, 24' and 24" of the friction bore 22 converges inwardly in a longitudinal direction at a slight angle toward the longitudinal centerline 20 and toward the closed rear end 16 of housing 12

Figure 2:
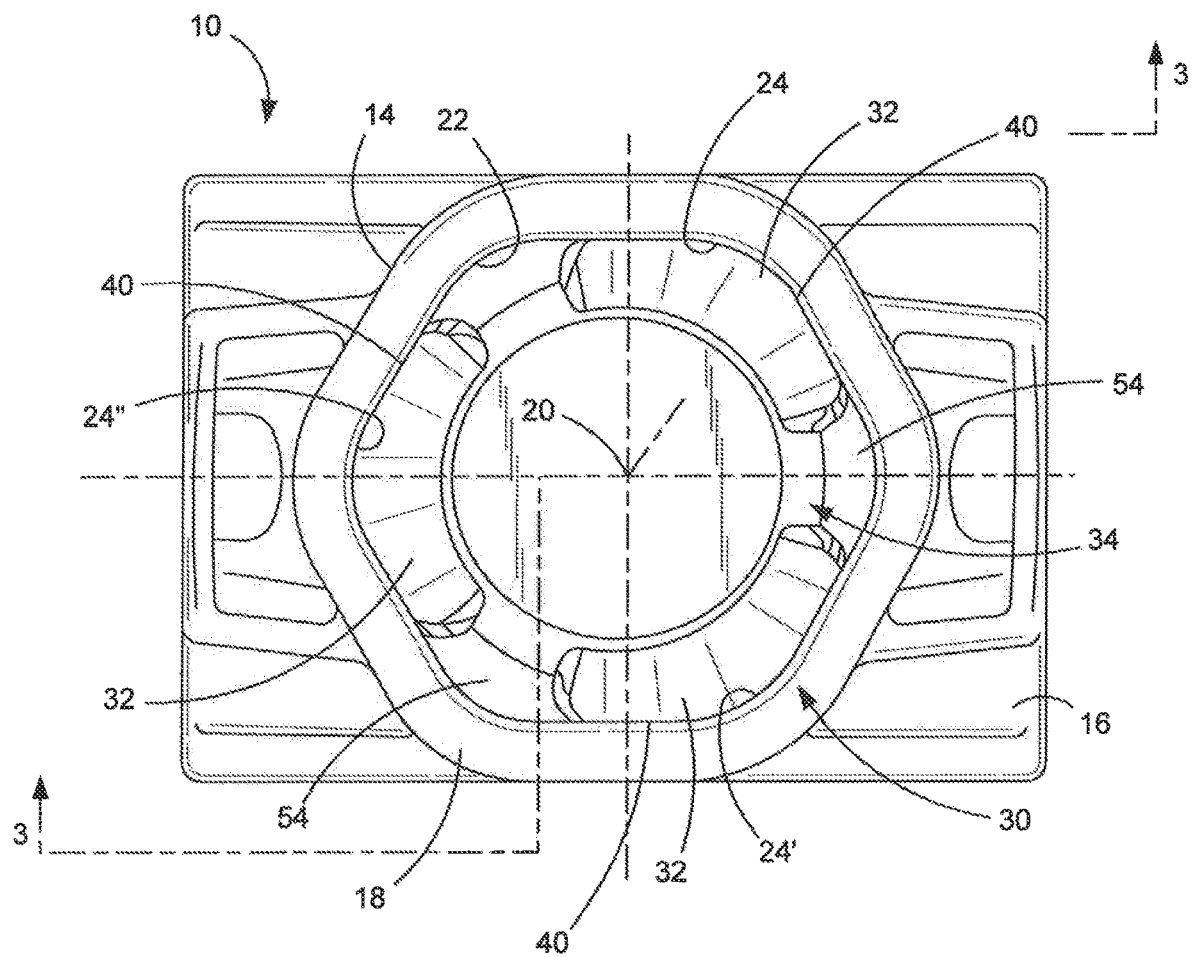
FIG. 2 is a top plan view of the draft gear illustrated in FIG. 1.
Figure 3:
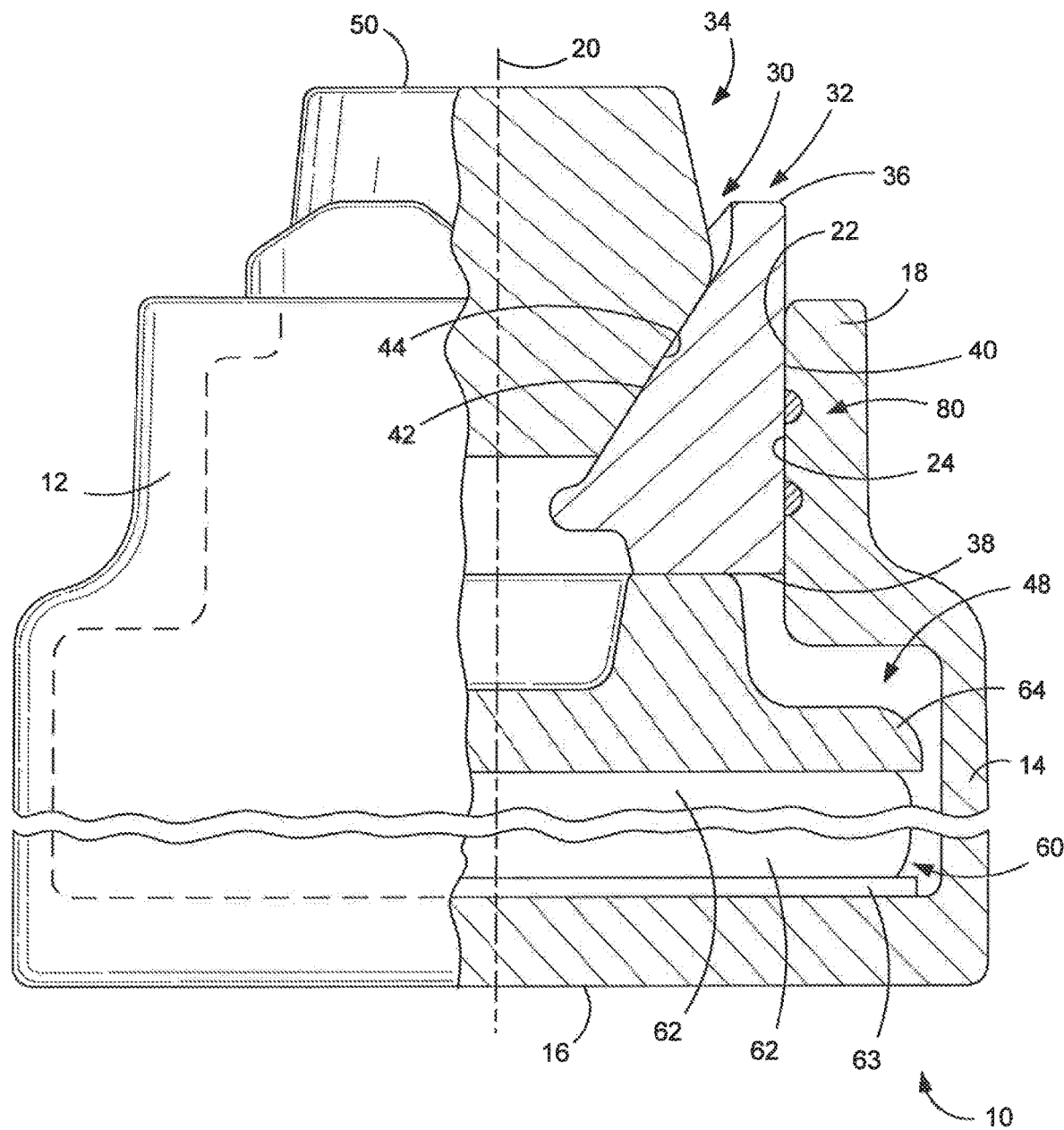
FIG. 3 is an enlarged sectional view taken along line 3-3 of FIG. 2.

In the embodiment illustrated by way of example in FIGS. 1 through 3, draft gear 10 includes a friction clutch assembly, generally identified by reference numeral 30, arranged, at least partially, in operable combination with and within the housing 12. In the embodiment illustrated by way of example in FIG. 2, friction clutch assembly 30 includes multiple sliding components which operate in conjunction with the draft gear housing 12 to define sliding surfaces therebetween. In the embodiment illustrated byway of example in FIG. 2, friction clutch assembly 30 includes a set of at least three friction shoes or members 32 disposed between the housing 12 and an actuator 34. In the exemplary embodiment, each of the friction shoes or members 32 are arranged in operable combination with the actuator or wedge 34 which is adapted for longitudinal reciprocation within the friction bore 22 of the draft gear housing 12 during operation of draft gear 10.

In the embodiment shown for example, the friction shoes or members 32 of clutch assembly 30 are identical in configuration and compliment the functional and curved internal surfaces 24, 24' and 24" of the friction bore 22 defined by draft gear housing 12, In the embodiment illustrated in FIG. 3, each friction shoe 32 has an outer end 36, which preferably extends longitudinally beyond the upper end of housing 12, and an inner end 38. Each member 32 operates in combination with the housing 12 and defines two frictional sliding surfaces therebetween. In the exemplary embodiment, each friction shoe or member 32 has a curved and angled outer surface 40 configured to complement, engage and slide along one of the three functional and curved internal surfaces 24, 24' and 24" defining the friction bore 22 of housing 12. The curved and angled outer surface 40 of each shoe 32 preferably extends longitudinally between the outer end 36 and inner end 38 of each shoe 32. In the embodiment illustrated by way of example, the inner end 38 of each friction shoe operably engages a follower plate 48 arranged for sliding movements in housing 12.

In that embodiment of draft gear illustrated in FIG. 3, each friction shoe 32 is also characterized by a longitudinally inclined inner friction surface 42 which coacts with a complementary and longitudinally inclined friction surface 44 on the actuator or wedge 34 in a manner well-known in the art. From the above, it should be understood, in response to the actuator or wedge moving toward the closed end 16 of the housing 12 in response to impact forces being applied to a free end 50 of the wedge 34, the inclined friction surfaces 44 on the actuator or wedge 34 operate in combination with the inclined inner friction surface 42 on each friction shoe 32 to move the friction shoes 32 longitudinally whereby causing the outer friction surface 40 of each shoe 32 to press, with significant force, against a respective functional and curved internal frictional surface 24, 24' and 24" of the friction bore 22 so as to dissipate the impact and energy inputted to the draft gear during operation.

The draft gear 10 illustrated by way of example in the drawings further includes a spring assembly, generally identified in FIG. 3 by reference numeral 60. Like the draft gear, spring assembly 60 can take any of a myriad of different designs without detracting or departing from the sprit and scope of this invention disclosure. Suffice it to say, in the illustrated embodiment, the spring assembly 60 is disposed within the hollow draft gear housing 12 between the closed end 16 (FIG. 1) and the friction clutch assembly 30 (FIG. 3) for absorbing, dissipating and returning energy imparted to the draft gear 10. In the form shown by way of example in FIG. 3, spring assembly 60 includes a series of axially stacked pads 62 sandwiched between steel plates 63. As is conventional, the spring assembly 60 serves to maintain the friction shoes 32 and wedge 34 in operable combination relative to each other while maintaining the curved outer surface 40 of each shoe in operable engagements with the respective functional curved internal surface 24, 24' and 24' of the friction bore 18.

During operation of that draft gear 10 illustrated for exemplary purposes, axial movements of the shoes 32 and wedge 34, toward the closed end 16 (FIG. 1) of housing 12 and in response to impact forces being applied to the draft gear 10, are dissipated in two respects. First, the impact forces applied to the draft gear 10 are dissipated and returned by the spring assembly 60 operably arranged between the follower plate 64 and the closed or rear end 16 of draft gear housing 12. Second, the impact forces applied to the draft gear 10 are dissipated by the wedge 34 slidably moving the outer friction surface 40 of each shoe 32 radially inward toward the axis 20 of the draft gear 10 and axially downward against the respective functional internal friction curved surfaces 24, 24", 24" of housing 12 with a significant level of force.

As known in the art, too little friction between the frictional surfaces of the clutch assembly 40 and the respective frictional surfaces 214, 24' and 24" of housing 12 can be detrimental in the loss of energy displacement and absorption, while too much friction between the frictional surfaces of the clutch assembly and the respective frictional surfaces of the housing 12 can compromise the function of the clutch assembly 30 while requiring too much force to activate and/or release the clutch assembly 30 during operation of the draft gear 10. As such, it is known to provide lubricant inserts between the frictional surfaces of the friction clutch assembly and respective frictional surfaces on housing 12. The heretofore known lubricant inserts, however, have certain drawbacks which are addressed by the present invention disclosure.

Figure 4:
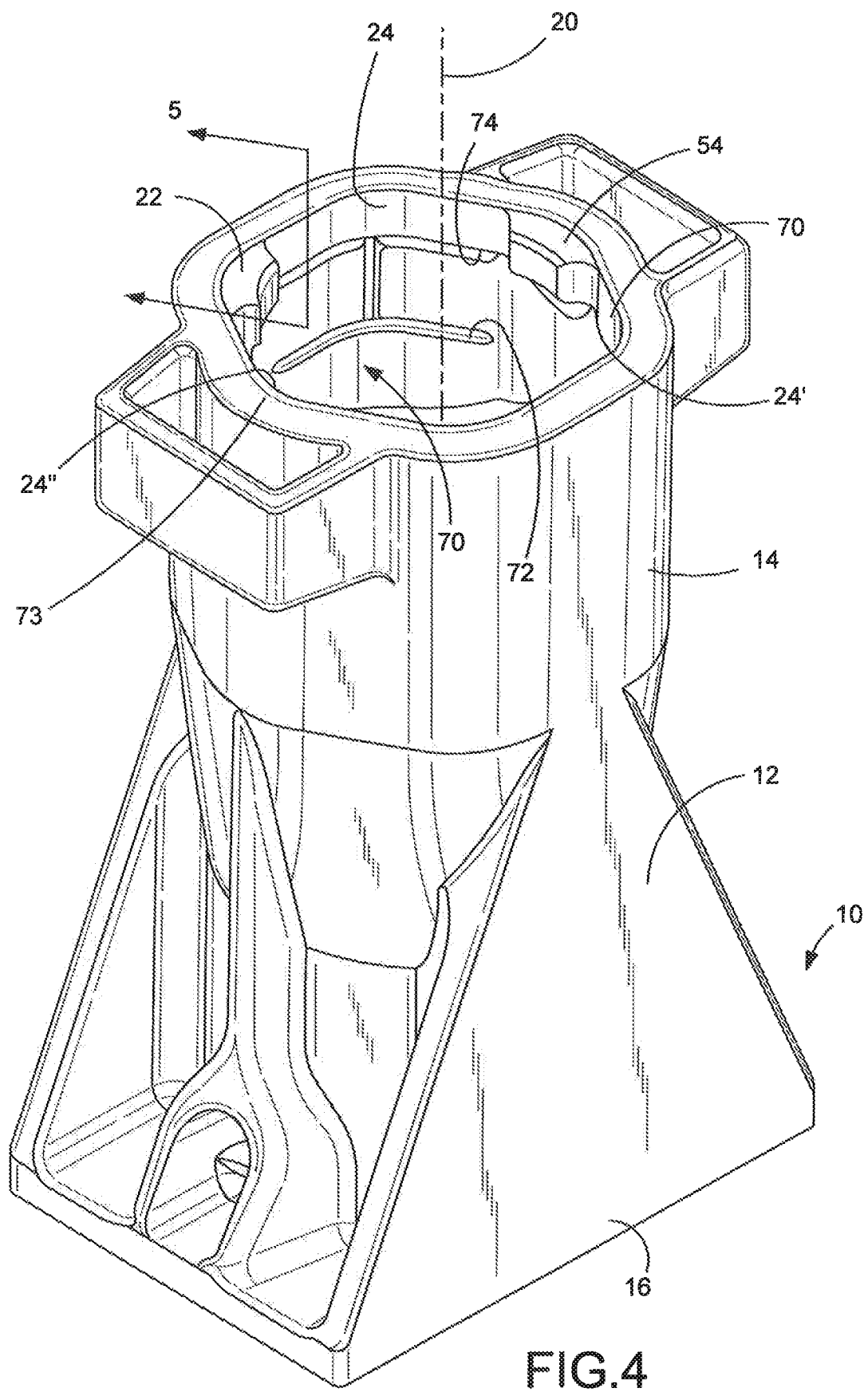
FIG. 4 is a perspective view of the draft gear shown in FIG. 1 with parts removed to illustrate additional features of the draft gear.

In the embodiment shown byway of example in FIG. 4, the frictional surfaces 24, 24'. 24" in the housing 12 define a series of open-sided recesses or cavities 70. In one embodiment, the recesses or cavities 70 are cast thereinto during the casting procedure for the housing 12, in that embodiment illustrated in FIG. 4, each cavity or recess 70 includes a first open-sided channel 71, a second open-sided channel 72, and an open-sided interconnecting channel 73, The channels 71, 72 and 73 are arranged in a canted, generally H-shaped pattern relative to each other.

Figure 5:
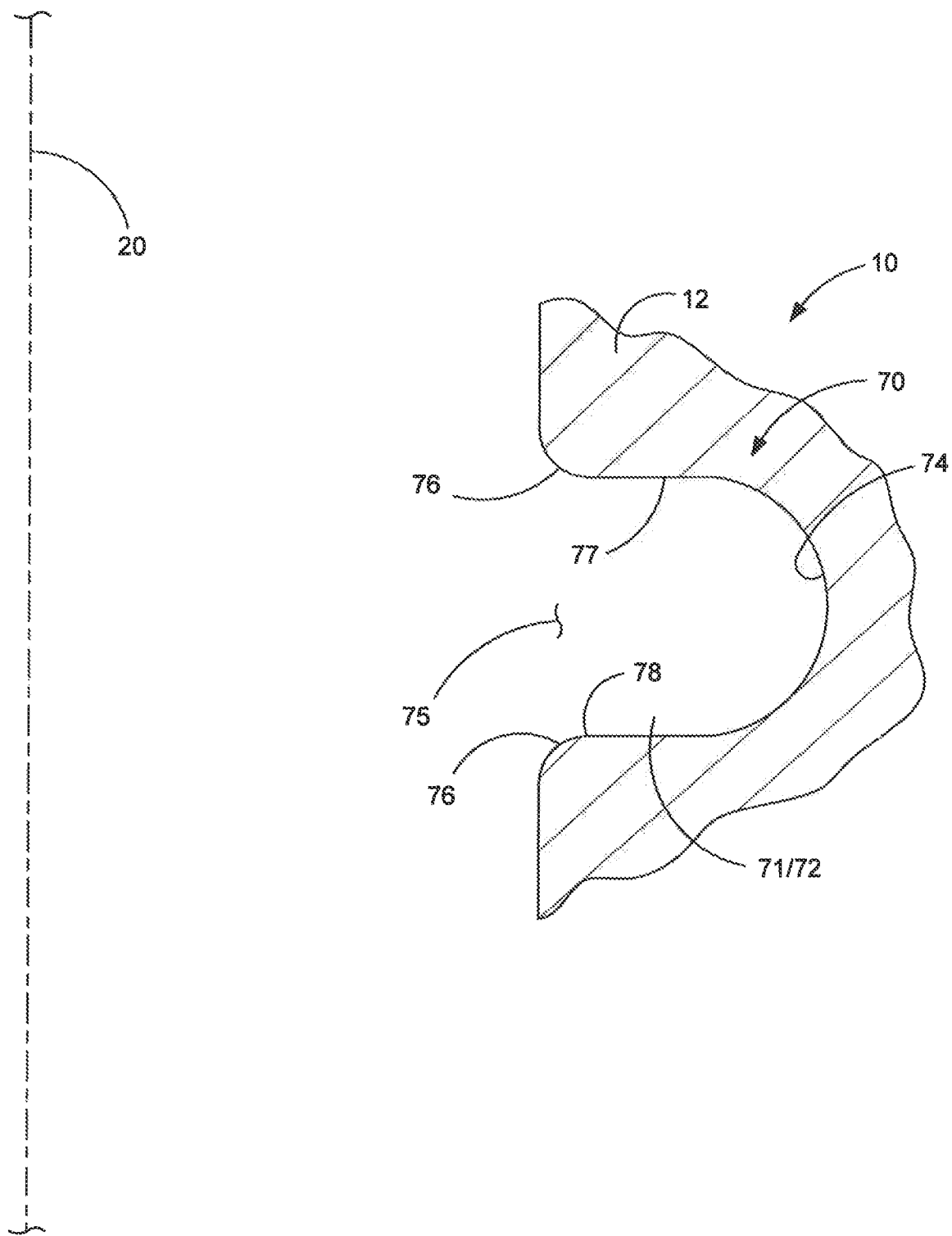
FIG. 5 is an enlarged and fragmentary sectional view taken along line 5-5 of FIG. 4.
Figure 6:
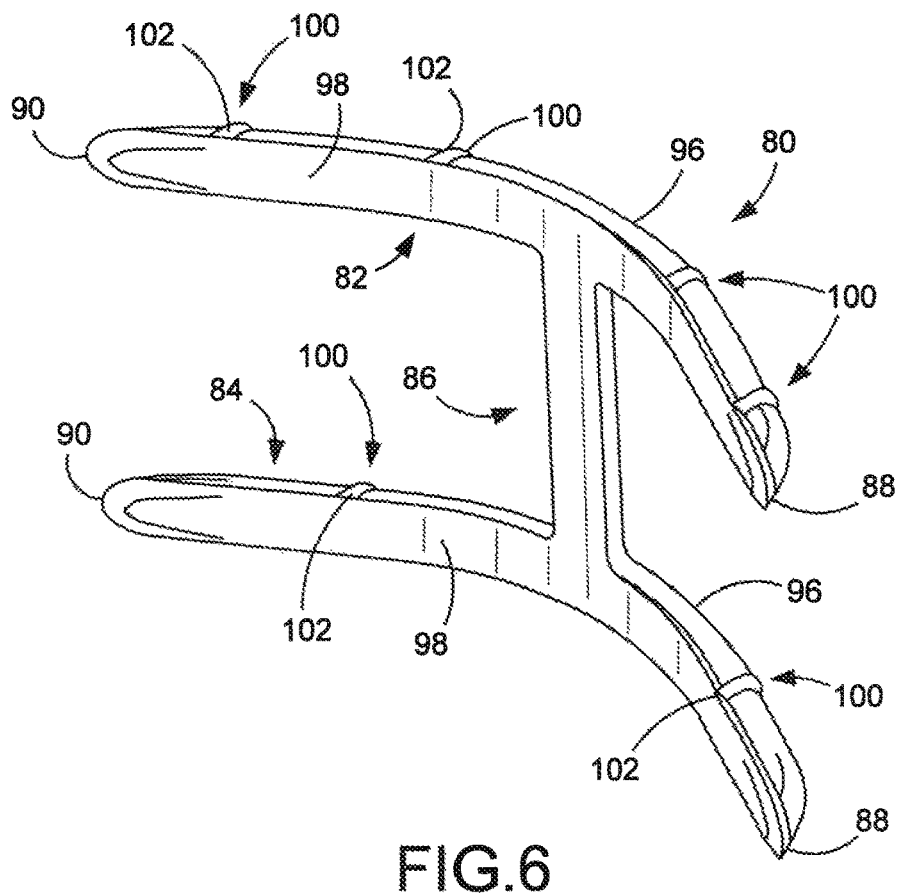
FIG. 6 is a perspective view of a preferred form of a preformed friction modifying insert according to this invention disclosure.

In the illustrated embodiment, the channels 71 and 72 are substantially identical and, thus, only channel 71 will be discussed in detail. Preferably, and in the embodiment illustrated by way of example in FIG. 5, each channel 71, 72 has a closed end 74, disposed the furthest distance from axis 20 of housing 12, and an open end 75 disposed closer to axis 20 than is the closed end 74. As will be appreciated by those skilled in the art, and because the channels 71/72 are preferably cast into the housing 12, the perimeter of the open end 75 of each channel 71, 72 is radiused as at 76. Moreover, and in the example schematically illustrated in FIG. 5, each channel 71,72 of each recess 70 has interior opposed surfaces 77 and 78 which are separated from each other by a predetermined distance. Because recess 70 is preferably cast into the housing 70, however, the tolerances associated with the predetermined distance separating the interior surfaces 77 and 78 of recess 70 from each other can and do vary between castings.

A salient concept or feature of this invention disclosure involves modifying the heretofore known design of a preformed friction modifying lubricant insert, generally identified by reference numeral 80, adapted to be pressed into each recess 70 (FIG. 3) in the housing 12 to facilitate reciprocatory movements of the friction clutch assembly during operation of the railroad freight car draft gear 10 (FIG. 1). In one form, each preformed friction modifying lubricant insert 80 is formed from at least one of the following materials: brass alloy, bronze alloy, lead alloy, impregnated plastics. In the preferred embodiment, and to facilitate assembly and operation of the draft gear 10, each preformed friction modifying lubricant insert 80 is of unitary or one-piece construction.

Figure 7:
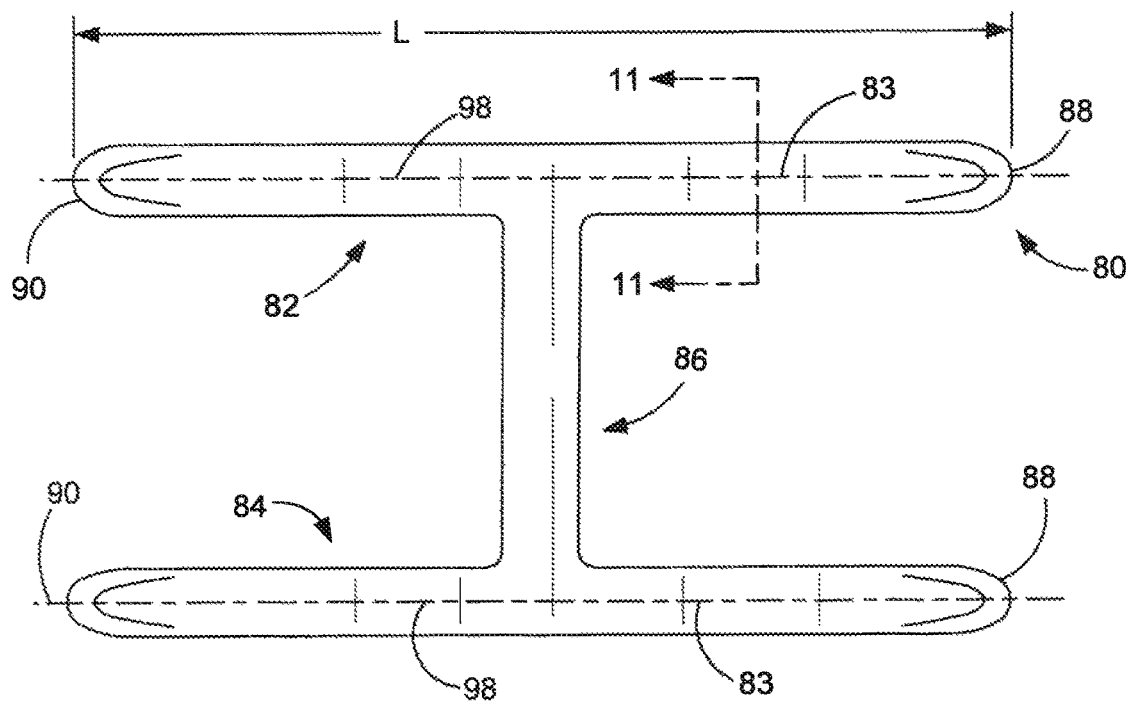
FIG. 7 is a front elevational view of the preformed friction modifying insert illustrated in FIG. 6.
Figure 8:
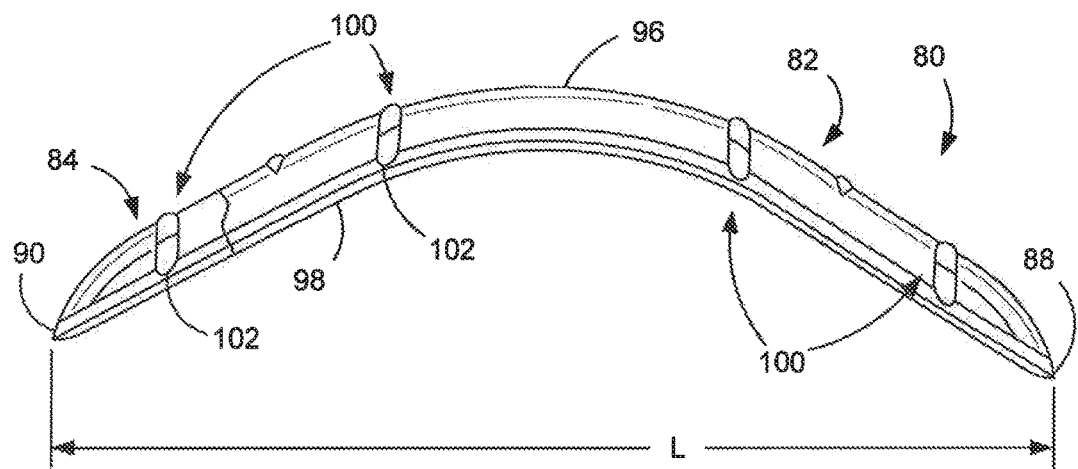
FIG. 8 is a top plan view of the preformed friction modifying insert illustrated in FIG. 6.

In the example illustrated in FIGS. 6 through 10, each preformed friction modifying lubricant insert 80 has a generally H-shaped configuration substantially similar to the configuration or shape of each recess or cavity 70 (FIG. 4) defined by the friction surface on housing 12 and into which the inserts 80 are to pressed or swaged. That is, each preformed friction modifying lubricant insert 80 preferably includes two active legs 82 and 84 and a third leg 86 for interconnecting the first 82 and second legs 84 of each insert 80 to each other. In the exemplary embodiment, the first and second legs 82 and 84, respectively, of each insert 80 have an elongated configuration and each defines a longitudinal axis 83 (FIG. 7). In the illustrated embodiment, and only because the friction surface on the housing 12 into which the insert is to be arranged, has a curvature, the first and second legs 82 and 84, respectively, of each insert 80 are preferably designed with a substantially similar feature to the curvature of the functional and curved internal surfaces 24, 24', 24" defined by housing 12. It should be appreciated, however, the generally H-shaped configuration of the insert 80 described in the exemplary embodiment, can take on any of a myriad of other shapes including a plurality of leg profiles, curved or flat, without detracting or departing from the spirit and scope of this invention disclosure. That is, the insert 80 can be configured such that the legs of the insert are interconnected to each other in an "H", "N", "V", "Z" or "U" shape, or additional legs can be added in more complicated shapes and designs with varying degrees of curvature while fitting into alternative friction surfaces such as, liner plates, actuators, or shoes instead of a housing.

Figure 9:
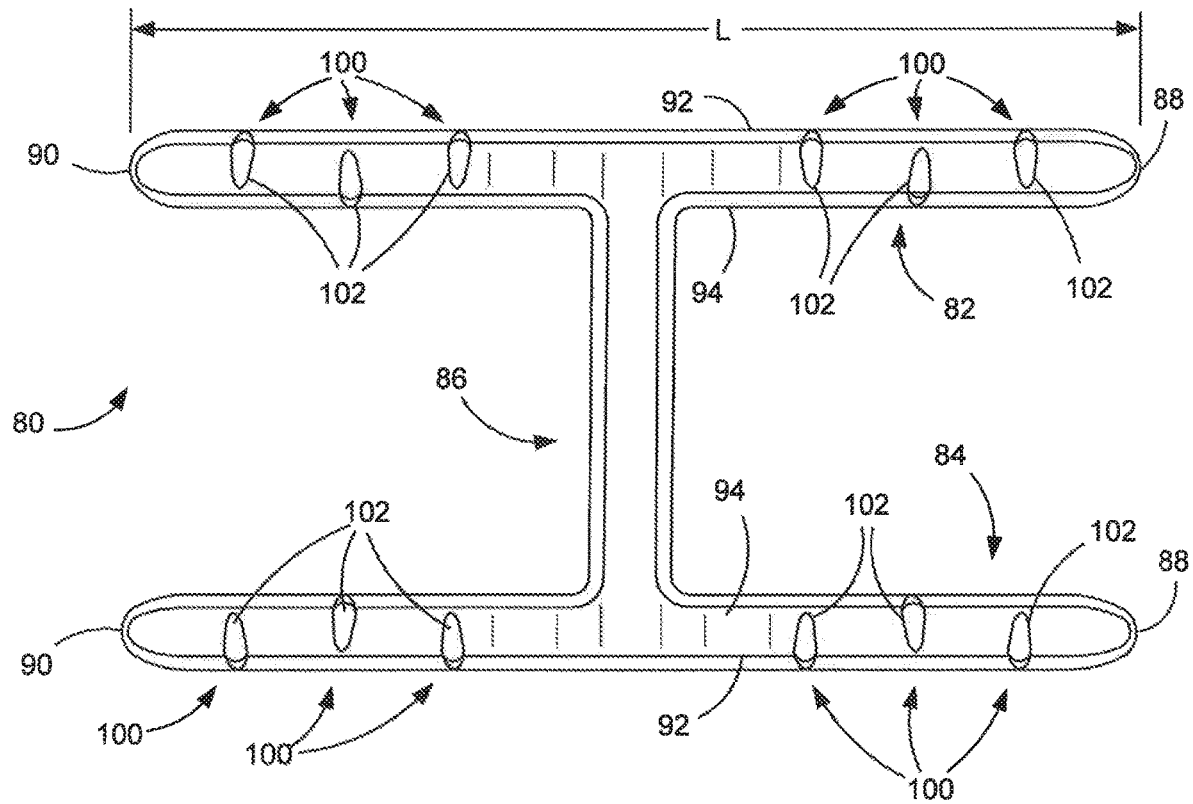
FIG. 9 is a rear elevational view of the preformed friction modifying insert illustrated in FIG. 6.
Figure 10:
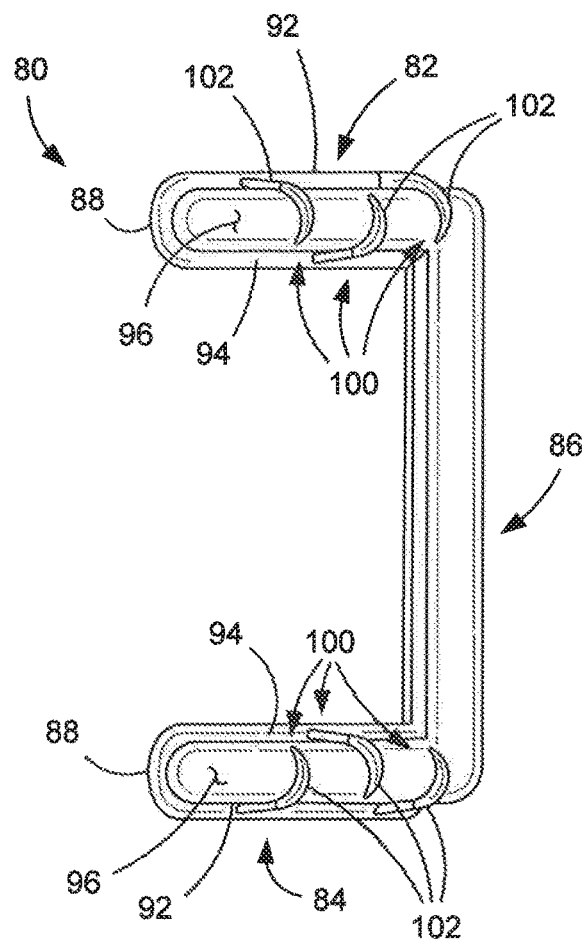
FIG. 10 is a side elevational view of the preformed friction modifying insert illustrated in FIG. 6.
Figure 11:
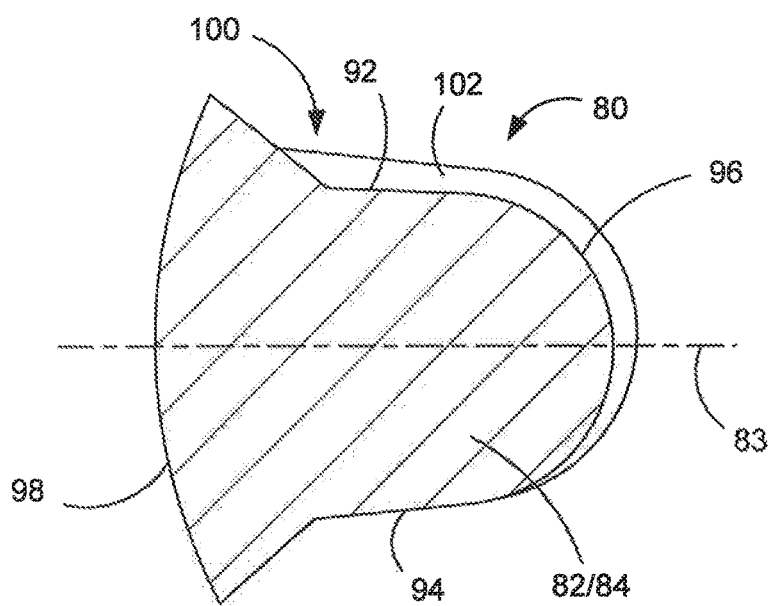
FIG. 11 is an enlarged sectional view taken along line 11-11 of FIG. 7.

Preferably, and as shown in FIGS. 6 through 10, each leg 82 and 84 of the preformed lubricant or friction modifying lubricant insert 80 has first and second longitudinally spaced ends 88 and 90 which define the length L of each leg 82 and 84, Moreover, and turning to FIGS. 10 and 11, each leg 82, 84 of the preformed lubricant or friction modifying lubricant insert 80 preferably has first and second surfaces 92 and 94, respectively, extending substantially the entire length L (FIG. 7) of each leg 82 and 84, In the illustrated embodiment, the surfaces 92 and 94 on each leg 82, 84 of the insert 80 are separated by a predetermined distance. Notably, and to enhance the joiner between each insert 80 and housing 12 into which the insert 80 is pressed, the predetermined distance separating surfaces 92 and 94 (FIG. 11) on each leg 82, 84 of the insert 80 is less than the predetermined distance separating surfaces 77 and 18 of each blind recess 70 into which the insert 80 is pressed or swaged.

In a preferred form, the cross-sectional profile of each leg 82, 84 and 88 of each insert 80 has a generally bell-like configuration. In the exemplary embodiment illustrated in FIG. 11, an outer end 96 of each leg 82, 84 (FIG. 10) of each preformed lubricant or friction modifying lubricant insert 80 extends substantially the entire length L (FIG. 7) of the insert 80 and, in the illustrated embodiment, has a rounded configuration joining and extending between the surfaces 92 and 94 of each leg 82, 84. An inner end 98 each of the legs 82, 84 (FIG. 10) of each preformed lubricant or friction modifying lubricant insert 80 extends substantially the entire length L (FIG. 7) of the insert 80 and is configured to facilitate the insert 80 being swaged into place within the respective recess 70 in the friction bore 22 (FIGS. 4 and 5) during initial assembly of the draft gear 10 while allowing lubricant or friction modifying lubricant insert 80 to be effective and active almost immediately with positive engagement with the outer surface 40 of the respective shoe 32 of the clutch assembly 30 (FIG. 3) during initial function of the draft gear 10 "out-of-the box".

Figure 12:
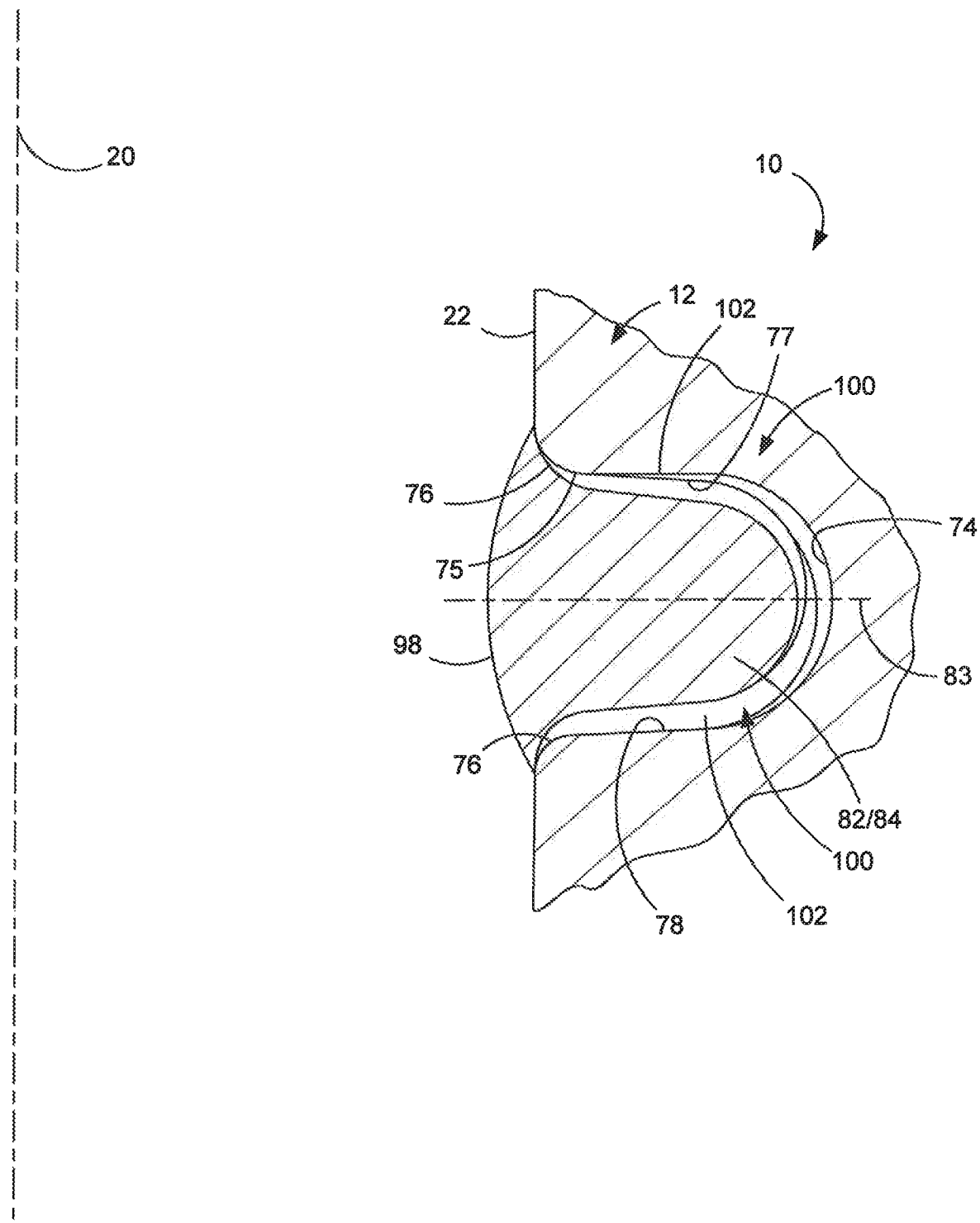
FIG. 12 is a view similar to FIG. 11 but with a portion of an insert being initially swaged into operable association within a component of the draft gear.

In the exemplary embodiment illustrated in FIG. 11, the inner end 98 on the legs 82, 84 (FIG. 10) of each preformed lubricant or friction modifying lubricant insert 80 has an outwardly flared and generally convex vertical configuration. As shown in FIG. 12, and following initial insertion into the respective channel in the cavity or recess 70, the outwardly flared and generally convex vertical configuration of the inner end 98 of each leg 82, 84 of the insert 80, at its apex, initially projects beyond the respective inner friction surface defined by the draft gear housing 12. As will be appreciated by those skilled in the art, such configuration beneficially allows the apex at the of the convex and inner end of the insert 80 to initially contact the tool used to swag the insert 80 into place rather than such tool contacting an edge of the insert 80, Moreover, and as will be further appreciated by those skilled in the art, the flared configuration at the inner end 98 of each leg 82, 84 of the insert 80 allows the insert 80 to better seat on the radius 76 surrounding and extending the length of the open end 75 (FIG. 5) of each recess 70 which, in one form, results from the casting process of housing 12. By this design, and as the insert 80 is swaged into place, insert material will simultaneously fill the void created between the radiused shape at the of open or inner end 74 of the recess 70 and the insert 80 to enhance the joinder between each insert 80 and the draft gear housing 12.

Another one of the salient features of this invention disclosure involves configuring each leg 82, 84 of each lubricant or friction modifying lubricant insert 80 to provide a more regular or more uniform friction action without substantial diminution of friction between the friction surfaces on the clutch assembly and the respective friction surfaces on housing 12, To accomplish such result, the legs 82 and 84 of each insert 80 are configured to: facilitate crimping of the insert 80 during installation; and, to better support and properly fit the insert 80 into the recess or cavity 70 while allowing for tolerance variations within each recess 70. During the installation process, the enhanced design of the insert 80 promotes proper and effective displacement of the material from which the insert 80 is formed within the respective recess so as to ensure better activation while enhancing positive engagement between the engaging sliding surfaces of the clutch assembly 30 and housing 12.

To affect such desirous ends, each leg 82, 84 of the lubricant or friction modifying lubricant insert 80 preferably includes a plurality of longitudinally spaced projections 100 extending radially outward therefrom. In the exemplary embodiment, each projection 100 is formed integral with the legs 82, 84 and is configured as a raised rib 102, Notably, and as shown in FIGS. 9 and 10, any two longitudinally adjacent ribs 102 on each insert 80 radially extend outward from opposed surfaces 92 and 94 on the insert 80 in an offset manner relative to each other to enhance a crimping action and enhanced fit within the respective recess. Preferably, and as shown in FIG. 12, each raised rib 102 extends only partially about each leg 82, 84 of the inserts 80.

In summary, the present invention disclosure involves configuring the preformed friction modifying lubricant insert to establish an enhanced joinder with the housing particularly when the tolerances between the insert and housing approach minimum. Although the tolerance variation between the confronting surfaces of each respective lubricant receiving recess may be measured in thousandths of an inch, such tolerance variations can adversely affect proper placement and retention of the insert therewithin. Providing the projections 100 on each lubricant insert 80 facilitates an enhanced fit between the insert 80 and draft gear housing 12. To further enhance the joinder with the draft gear housing, each friction modifying insert 80 is initially formed with an outer flared end extending the length of each leg of the insert 80 and, disposed toward the open end of the recess in the draft gear housing. When the lubricant or friction modifying insert is initially pressed into the lubricant receiving recess in the draft gear housing, material from which the insert is formed flows or is displaced to fill the void created by the cavity edge along the perimeter of the recess which results from the draft gear housing casting process.

Furthermore, each friction modifying insert 80 is configured to enhance operational movements of the friction clutch assembly 30 at the very onset of draft gear operation. To affect these beneficial ends, an inner end of each friction modifying insert 80 is configured with a convex profile which initially projects past the static friction surface after the insert is pressed or swaged into place, Such a design allows lubricant material to be active immediately with positive engagement with the friction surface 40 of the respective shoe 32 "out-of-the box". As will be appreciated, one or more of the unique features set forth above can be embodied in combination with a generally flat friction modifying insert whether such insert has one or more legs in whatever configuration best suited from the purpose.

From the foregoing, it will be observed numerous modifications and variations can be made and effected to the draft gear a and lubricant inserts without departing or detracting from the true spirit and novel concept of this invention disclosure. Moreover, it will be appreciated this invention disclosure merely sets forth an exemplification of the invention disclosure and is not intended to limit or otherwise restrict the invention disclosure to the specific embodiment illustrated. Rather, this invention disclosure is intended to cover by the appended claims all such modifications and variations as fall within the spirit and scope of the appended claims.

What is claimed is:

1. A railroad freight car draft gear, comprising:
    a friction clutch assembly including friction members arranged in operable combination with an actuator adapted for longitudinal reciprocation during operation of said draft gear, and with each friction member having an outer friction surface which slides along a respective mating surface;
    a spring assembly for absorbing, dissipating, and returning energy imparted to said draft gear;
    with recesses being provided on the respective mating surfaces on the draft gear; and
    with a preformed friction modifying insert being pressed into each recess, with each insert including an elongated leg having opposed ends and projections extending radially outward from the leg and disposed between said ends, and wherein the projections on each insert includes a plurality of adjacent and raised ribs extending radially outward from the leg of each insert, and with each insert serving to facilitate reciprocatory movements of said friction clutch assembly relative to mating components during operation of said railroad freight car draft gear.

2. The railroad freight car draft gear according to claim 1, wherein each insert is formed from one of the following materials: brass alloy, bronze alloy, lead alloy, impregnated plastics.

3. The railroad freight car draft gear according to claim 1, wherein the leg of each insert has first, and second generally parallel surfaces joined by an outer end and a convex inner end.

4. The railroad freight car draft gear according to claim 1, wherein any two longitudinally adjacent projections on each insert radially extend from opposed generally parallel surfaces on each insert and are offset relative to each other.

5. The railroad freight car draft gear according to claim 1, wherein each, insert includes a second elongated leg having opposed ends and at least one projection extending radially outward from the second leg and disposed between said ends thereof.

6. The railroad freight car draft gear according to claim 5, wherein the elongated legs on each insert are interconnected to each other.

7. A railroad freight car draft gear, comprising:
an elongated metal and hollow housing;
a friction clutch assembly arranged in operable combination with said housing, said friction clutch assembly including friction members arranged in operable combination with an actuator adapted for longitudinal reciprocation during operation of said draft gear, and with each friction member having an outer friction surface which slides along a mating friction surface;
a spring assembly for absorbing, dissipating and returning energy imparted to said draft gear;
with recesses being provided on the mating surfaces on the draft gear;
with a preformed friction modifying insert being pressed into each recess for facilitating reciprocatory movements of said friction clutch assembly during operation of said railroad freight car draft gear, with each preformed insert including an elongated leg having opposed ends defining a length of said insert, and wherein each insert has and an outer end extending substantially the length thereof and which is disposed adjacent the closed end of the respective recess after the insert is pressed thereinto, and a flared inner end extending substantially the length of the insert and which is disposed toward the open end of each recess to enhance the fit of each insert when mating tolerances of the insert and the respective recess into which the insert is pressed approach minimum.

8. The railroad freight car draft gear according to claim 7, wherein each insert is formed from one of the following materials: brass alloy, bronze alloy, lead alloy, impregnated plastics.

9. The railroad freight car draft gear according to claim 7, wherein the leg of said insert has first, and second generally parallel surfaces joined by an outer end and a convex inner end.

10. The railroad freight car draft gear according to claim 7, wherein each insert includes a plurality of longitudinally adjacent and raised projections extending radially outward from the leg of the insert and offset relative to each other.

11. The railroad freight car draft gear according to claim 10, wherein any two longitudinally adjacent projections on each insert radially extend from opposed generally parallel surfaces on said insert.

12. The railroad freight car draft gear according to claim 11, wherein each projection includes a raised rib, with each rib extending only partially about the leg of the insert.

13. The railroad freight car draft gear according to claim 7, wherein each insert includes a second elongated leg having opposed ends, with the second leg of said insert having at least one projection extending radially outward therefrom and disposed between said ends thereof.

14. The railroad freight car draft gear according to claim 13, wherein the elongated legs on each insert are interconnected to each other.

15. A railroad freight car draft gear, comprising:
an elongated housing having external walls extending between a closed end and an open end, with the open end of said housing defining a friction bore having a curved internal surface;
a friction clutch assembly arranged within the open end of said housing, said friction clutch assembly including at least two friction shoes arranged in operable combination with an actuator adapted for longitudinal reciprocation within the friction bore of said housing during operation of said draft gear, and with each shoe having an angled outer surface which slides along the internal surface of said friction bore;
a spring assembly disposed within said housing between the closed end of said housing and said friction clutch assembly for absorbing, dissipating, and returning energy imparted to said draft gear;
with recesses being cast into the internal surface of the friction bore defined by said housing, with said housing defining a closed inner end and an open outer end for each recess; and
with a preformed friction modifying insert being pressed into each recess of the friction bore defined by said housing ends for facilitating reciprocatory movements of said friction clutch assembly during operation of said railroad freight car draft gear, with each insert being configured with an elongated and curved leg having opposed ends defining a length of said insert, with the curvature of said insert leg generally corresponding to the curvature of the internal surface of said friction bore, and wherein an outer end of said insert extends the length thereof and is disposed adjacent the closed end of the respective recess after said insert is pressed thereinto, and with an inner end extending the length of said insert and having a convex profile which initially projects past the curved internal surface of said friction bore after said insert is pressed thereinto.

16. The railroad freight car draft gear according to claim 15, wherein each insert is formed from one of the following materials: brass alloy, bronze alloy, lead alloy, impregnated plastics.

17. The railroad freight car draft gear according to claim 15, wherein the leg of said insert has first, and second generally parallel surfaces joined by an outer end.

18. The railroad freight car draft gear according to claim 15, wherein each insert includes a plurality of longitudinally spaced and raised projections extending radially outward from the leg of the insert.

19. The railroad freight car draft gear according to claim 18, wherein any two longitudinally adjacent projections on each insert radially extend from opposed generally parallel surfaces on said insert and are offset relative to each other.

20. The railroad freight car draft gear according to claim 18, wherein each projection is configured as a raised rib, with each raised rib extending only partially about each leg of the insert.

21. The railroad freight car draft gear according to claim 15, wherein each insert includes a second elongated leg having opposed ends and at least one projection extending radially outward from the second leg and disposed between said ends thereof.

22. The railroad freight car draft gear according to claim 21, wherein the elongated legs on each insert are interconnected to each other.

23. A railroad draft gear friction modifying insert for facilitating reciprocatory movements of a friction clutch assembly during operation of a railroad freight car draft gear, with said insert having an elongated leg with opposed ends defining a length of said insert therebetween, and wherein an inner flared end of said insert extends substantially the length of said insert and is disposed adjacent an open end of a respective recess defined by a mating surface on said draft gear after said insert is pressed thereinto, and with the inner end of said insert having a convex profile.

24. The railroad freight car friction modifies insert according to claim 23, wherein said insert is formed from one of the following materials: brass alloy, bronze alloy, lead alloy, impregnated plastics.

25. The railroad freight car friction modifying insert according to claim 23, wherein the leg of said insert has first and second generally parallel surfaces joined by an outer end.

26. The railroad freight car friction modifying insert according to claim 23, wherein said insert includes a plurality of longitudinally adjacent and raised projections extending radially outward from the leg of the insert.

27. The railroad freight car draft gear according to claim 26, wherein any two adjacent projections on said insert extend from opposed generally parallel surfaces on said insert.

28. The railroad freight car draft gear according to claim 26, wherein each projection includes a raised rib, and wherein each raised rib extends only partially about the leg of the insert.

29. The railroad freight car draft gear according to claim 23, wherein said insert includes a second elongated leg having opposed ends and projections extending radially outward from the second leg and disposed between said ends thereof.

30. The railroad freight car draft gear according to claim 29, wherein the elongated legs on said insert are interconnected to each other.

* * * * *